United States Patent [19]

Inoue

[11] 4,382,168
[45] May 3, 1983

[54] ULTRA-FINE FINISH EDM METHOD AND APPARATUS

[75] Inventor: Kiyoshi Inoue, Tokyo, Japan

[73] Assignee: Inoue-Japax Research Incorporated, Yokohama, Japan

[21] Appl. No.: 115,239

[22] Filed: Jan. 25, 1980

[30] Foreign Application Priority Data

Jun. 6, 1979 [JP] Japan .................................. 54-71643

[51] Int. Cl.³ .............................................. B23P 1/02
[52] U.S. Cl. ............................. 219/69 M; 219/69 P; 219/69 C
[58] Field of Search .................. 219/69 P, 69 C, 69 S, 219/69 M

[56] References Cited

U.S. PATENT DOCUMENTS 3,778,579 12/1973 Takarada ........................... 219/69 C
3,943,321 3/1976 Pfau et al. ......................... 219/69 C

FOREIGN PATENT DOCUMENTS 52-58194 5/1977 Japan .................................. 219/69 P
1432045 4/1976 United Kingdom .

Primary Examiner—C. C. Shaw
Attorney, Agent, or Firm—Karl F. Ross

[57] ABSTRACT

An improved method of and power-supply system for EDM whereby machining pulses of on-time in the order of 10 to 100 nanoseconds are passed through an EDM gap to assure ultra-fine finish EDM results by using the gap current build-up characteristic resulting from each individual machining pulse and thereby timing the termination thereof to compensate for a delay caused by the inherent presence of a stray impedance in the gap power circuit lines. The machining pulses can be in the form of successive, intermittently interrupted trains of elementary pulses of which on-time is defined at a minimum which provides a minimum unit of stock removal by each pulse.

13 Claims, 7 Drawing Figures

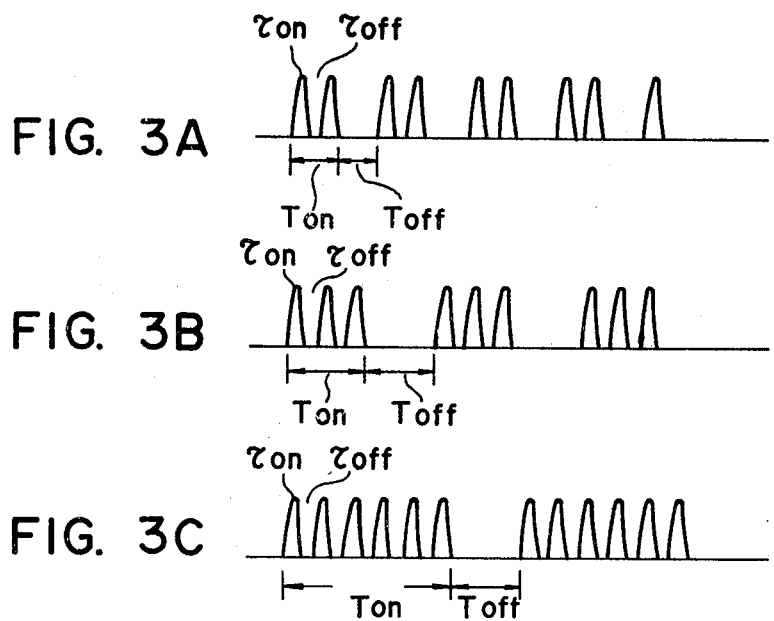
FIG. 3A
FIG. 3B
FIG. 3C
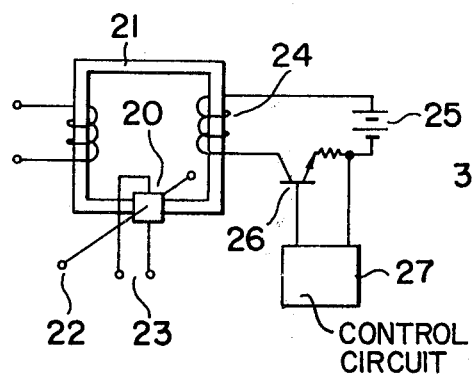
FIG. 4
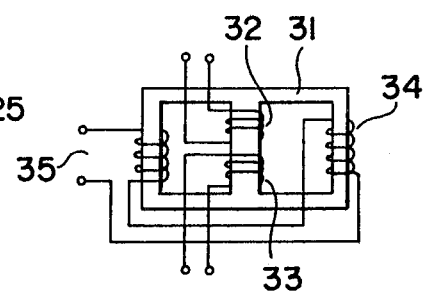
FIG. 5

ULTRA-FINE FINISH EDM METHOD AND APPARATUS

FIELD OF THE INVENTION

The present invention relates to electrical discharge machining (EDM) and, more particularly, to an improved method of and power-supply system for EDM in which a succession of discrete and precisely time-controlled machining pulses are passed through a machining gap filled or flushed with an EDM fluid medium (e.g. dielectric or low-conductive liquid) between a tool electrode (e.g. of solid, three-dimensional form or continuous elongated form) and a workpiece juxtaposed therewith to remove material from the workpiece.

BACKGROUND OF THE INVENTION

As the accumulation of extensive theoretical and experimental evidence from investigation of the EDM process indicates, ultra-fine finish EDM results can be obtained by controlling each individual machining (discharge) pulse which is repetitively passed through the EDM gap to limit its duration or so-called on-time $\tau on$ in the range between 0.01 and 1 microsecond, preferably in the order of 10 nanoseconds. The successive discharges should be discrete and should be time-spaced by an "off" time $\tau off$ or pulse interval likewise precisely controlled at a suitable value, preferably not greater than five or ten times longer than the on-time, so that the application of a predetermined amount of energy from the power supply is strictly confined in each pulse. A power-supply system which would be so designed is also desired to be capable of wide selection of on-time and off-time of required machining pulses precisely independent from each other.

Attention is also drawn to the preference in some important areas of the use of a certain mode of machining pulses, development of which was initiated more than a decade ago, even extending back to incipient EDM history (cf. Japanese patent specifications No. 39-20494 published 19 Sept. 1964 and No. 44-8317 published 18 Apr. 1969) but whose particular advantages have increasingly been recognized in the recent years. Thus, machining pulses may advantageously be applied in the form of intermittently interrupted elementary pulses or successive, time-spaced trains of elementary pulses. The term "elementary pulse" is used to refer to a unit or minimum energy pulse whereby a unit or minimum volume of stock removal $\eta$ is assured. In that mode, each train has a preset duration Ton and thereby contains a preset number n of elementary pulses which represents essentially a total stock removal of the amount ($n \times \eta$) and adjacent trains are separated by a time interval Toff. Thus, given an elementary pulse of on-time $\tau on$ and off-time $\tau off$, a series of any desired "composite" pulses are obtainable by simply adjusting the train duration $\tau on$ or the number of elementary pulses in each train and the time interval $\tau off$ or the number of elementary pulses to be periodically interrupted. Here again, the unit pulse is desirably assigned a minimum on-time $\tau on$ and also a minimum off-time $\tau off$ of the same order.

Whichever, consecutive pulses or periodically interrupted elementary pulses, are used, each precisely time-controlled pulse of an extremely short on-time $\tau on$ and $\tau off$ is best formed in a power-supply system designed to "pulse" the DC output by means of an electronic switch having "on" and "off" states in response to the corresponding drive "on" and "off" signals. Note that the use of FET's (field-effect type transistors) or MOS's (metal-oxide semiconductor transistors) now allows such extremely rapid switching in the system. In the prior EDM art, however, no system or method which is designed to reliably provide or capable of truly satisfactorily furnishing EDM pulses of on-time and off-time as short as less than 1 microsecond precisely in accordance with corresponding drive signal pulses could be realized.

OBJECTS OF THE INVENTION

It is, accordingly, an important object of the present invention to provide an improved EDM method whereby machining pulses of such an extremely short on-time which has hither been impractical in the EDM circuit using the switching of a DC source are reliably and satisfactorily provided in the basically same circuit arrangement.

Another object of the invention is to provide a power-supply system for carrying out the method.

SUMMARY OF THE INVENTION

It has now been observed that a stray impedance inherently contained in a power circuit connecting the switch with a machining gap in series with an input DC source unavoidably causes a delay before each individual machining pulse completely terminates following the termination of the corresponding signal pulse applied to the switch and this delay cannot be negligible when the pulse duration is as short as less than 1 microsecond. I have noted that the stray impedance typically comprises a stray capacitance in the range between 0.01 and 0.05 microfarad, a stray inductance in the range between 10 and 50 microhenry and a resistance in the order of $10^{-5}$ ohm.cm.

The invention is accordingly directed to a method of electrical-discharge machining a workpiece with a tool electrode (e.g. a solid, three-dimensional electrode or a wire or the like elongate electrode) across a fluid-filled machining gap by passing a succession of machining pulses of a predetermined on-time $\tau on$ and off-time $\tau off$ through the machining gap between the tool electrode and the workpiece by repetitively turning on and off an electronic switch connected in a power circuit in series with a DC source and the machining gap with a succession of signal pulses corresponding to the machining pulses, the power circuit having a stray impedance sufficient to cause a delay before each of the machining pulses terminates following the termination of each corresponding signal pulse applied to the switch. The method according to the present invention includes the steps of: setting the on-time $\tau on$ at a desired value in the range between 0.01 and 1 microsecond; sensing the build-up characteristic of the gap current resulting from the passage of each of the machining pulses through the machining gap; providing a pulse interruption signal for terminating the corresponding signal pulse applied to the switch, upon the sensed gap current exceeding a predetermined value in conjunction with the desired value of the on-time $\tau on$.

According to the apparatus aspect of the invention, the power-supply system includes a DC source, an electronic switch, a power circuit for connecting the switch with a tool electrode and a workpiece in series with the DC source and a drive circuit for providing a succession of signal pulses of a predetermined on-time and off-time and thereby turning the switch alternately on and off to pass through a machining gap formed between the tool electrode and the workpiece a succession of machining pulses of a predetermined on-time and off-time corresponding to the on-time and off-time of the signal pulses, the power circuit containing a stray impedance sufficient to cause a delay before each of the machining pulses terminates following the termination of each corresponding signal pulse. The apparatus according to the invention includes: a pulse source in the drive circuit for setting the on-time of the signal pulses at a desired value of the on-time of the machining pulse in the range between 0.01 and 1 microsecond; means for sensing the build-up characteristic of the gap current resulting from the passage of each of the machining pulses through the machining gap; threshold circuit means responsive to the sensed gap current for providing a pulse interruption signal, upon the sensed gap current exceeding a predetermined value, to terminate the corresponding signal pulse applied to the switch; and means associated with the last-mentioned means for establishing the threshold value in conjunction with the on-time of signal pulses set in the pulse source.

The machining pulses may be in the form of successive trains of elementary machining pulses. Thus, a succession of elementary signal pulses may be provided by a pulse source and periodically interrupted to form, through the machining gap, the successive machining elementary pulse trains separated by a cut-off time interval.

The high-sensitivity current sensor preferably makes use of a Hall-effect element and may also be constituted by a magnetic-amplifier type transducer.

BRIEF DESCRIPTION OF DRAWING

In the accompanying drawing:

FIGS. 4 and 5 are schematic diagrams of preferred forms of the gap current detector used in the present invention.

SPECIFIC DESCRIPTION

Figure 1:
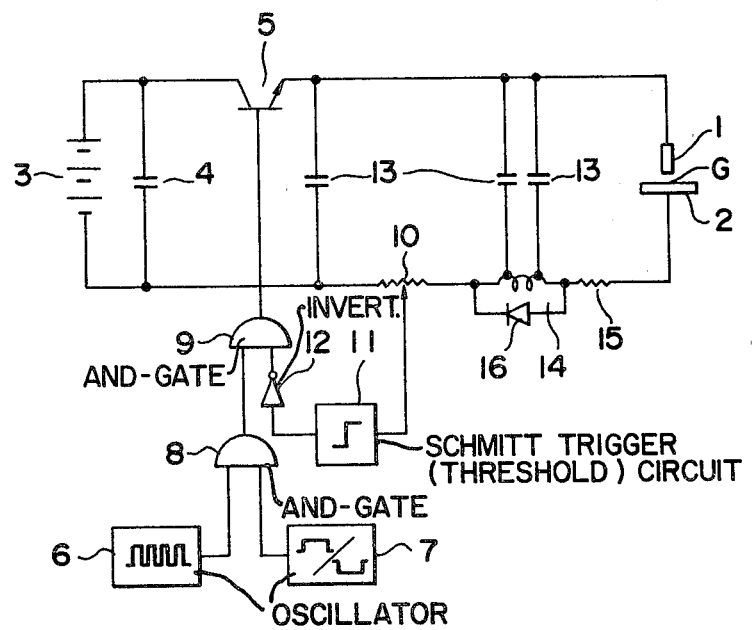
FIG. 1 is a circuit diagram illustrating the principles and a certain embodiment of the present invention.

In FIG. 1 an EDM tool electrode (e.g. a solid, three-dimensional electrode or a wire or the like continuous elongate electrode) is shown juxtaposed with a workpiece electrode 2 across a machining gap G which is flooded with an EDM fluid medium (e.g. kerosene or distilled water). A machining power supply comprises a DC source 3 and a current smoothing capacitor 4 and is connected to the tool electrode 1 and the workpiece 2 in series with a power switch 5. The switch 5 is typically a bank of power transistors as shown which are preferably of FET or MOS type capable of ultrarapid switching (with a time constant in the order of 10 nanosecond) and is repetitively turned on and off to pulse the smoothed DC output supplied by the source 3 and the capacitor 4 and thus provide a succession of machining pulses across the gap G between the tool electrode 1 and the workpiece 2.

The drive circuit for the switch 5 includes a first oscillator 6 which provides a series of elementary pulses of a predetermined short on-time $\tau on$ and a predetermined short off-time $\tau off$, the on-time corresponding to a predetermined unit of stock removal desired. A second oscillator 7 provides a series of signal pulses of a predetermined on-time or duration Ton and off-time or interval Toff both of which are much longer than those $\tau on$ and $\tau off$ of the elementary pulses. The outputs of the first and second oscillators 6 and 7 feed a first AND gate 8 whose output leads to a first input of a second AND gate 9. The output of the second AND gate 9 is connected to the control electrode of the power switch 5 to control its switching operation.

In series with the electrodes 1 and 2 and the principal electrodes of the power switch 5 there is provided a sensing resistor 10 to detect the current magnitude of a discharge pulse to develop a voltage signal representing it. A threshold circuit 11 having a preselected threshold value is associated with the sensing resistor 10 and may be constituted by a Schmitt-trigger circuit. The output of the threshold circuit 11 is applied via an inverter or NOT gate 12 to the AND gate 9 at its second input. Stray capacitance, stray inductance and circuit resistance included in the power discharge circuit connecting the source (3, 4) with the machining gap G(1, 2) are indicated by a capacitors 13, an inductance 14 and a resistor 15, respectively. The inductor 14 is shown shunted by a diode 16. In the typical EDM circuit, the stray capacitance, the stray inductance and the circuit resistance range between 0.01 and 0.05 $\mu F$, between 10 and 50 $\mu H$ and in the order of $10^{-5}$ ohm, respectively.

With conventional circuit arrangements comprising a power switch 5 and a drive circuit therefor which merely contains an oscillator 6 or a combination of oscillators 6, 7 and an element 8, it has been impossible to produce through the machining gap G a succession of or intermittently interrupted successions of fine discrete elementary pulses of an on-time $\tau on$ and off-time $\tau off$ which are as short as 0.01 microsecond. It has now been recognized that this difficulty is due to the unavoidable presence in the discharge circuit of stray capacitance, inductance and resistance in the ranges and order indicated above.

In accordance with the present invention, an improved EDM power switching circuit is provided which incorporates the discharge-current detector 10 and the threshold circuit 11. During each control cycle when each elementary signal pulse of the oscillator 6 occurs, the power switch 5 is turned on to initiate an electrical discharge through the gap G. The sensing resistor 10 is responsive to the build-up of the discharge current and provides, at the input to the threshold circuit 11, a voltage signal which builds up in proportion to the current build-up. The output of the threshold circuit 11 is normally "0" which is inverted to "1" by the NOT gate 12 to enable the AND gate 9 through its second input so that whenever its first input is also "1", the switch 5 is held on.

When the current signal at the sensing resistor 10 exceeds a certain value established as the threshold level in the circuit 11, the latter is phase-converted to turn its output to "1" which, after inversion to "0" through the NOT gate 12, disables the AND gate 9, thereby turning the switch 5 off. The current through the machining gap G then decays at a rate determined by values of stray capacitance and inductance in the discharge circuit to complete the pulsed discharge. By establishing the maximum gap current in conjunction with the discharge time constant determined by the stray capacitance and inductance values, therefore, the on-time or time duration $\tau$on of each elementary pulse can be set as desired and a succession of so-controlled elementary discharge pulses periodically interrupted by the second oscillator 7 can be produced through the machining gap G.

Figure 2:
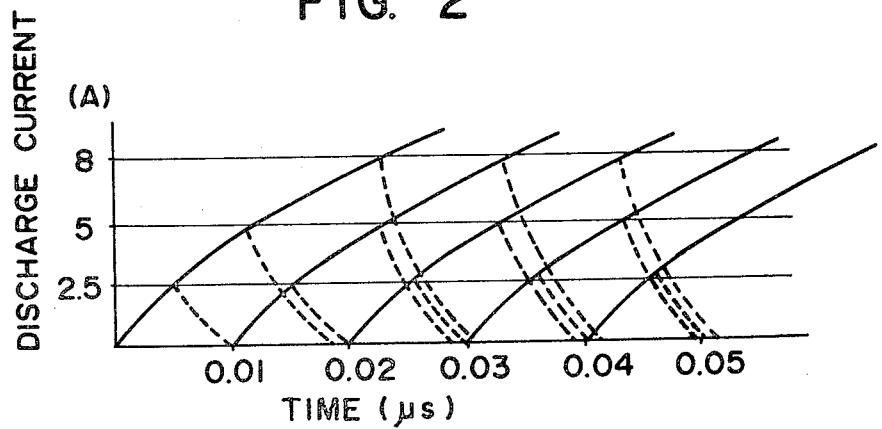
FIG. 2 is a waveform diagram illustrating the gap current build-up characteristic used in the present invention to provide various values of the on-time of machining pulses, FIG. 3 are waveform diagrams illustrating typical forms of successive and periodically interrupted elementary pulses which may be embodied according to the present invention.

The mode of change in which a discharge current builds up and decays according to the operation of the circuit of FIG. 1 is shown in FIG. 2. It is seen that, given the constants of the discharge circuit including the machining gap, the change proceeds with a predetermined build-up and decay characteristics. For example, if the maximum or peak current of 2.5 amperes is selected as the threshold level elementary pulses of a pulse duration or on-time $\tau$on of 0.01 microsecond can be precisely obtained. The on-time $\tau$on is likewise set at 0.02 and 0.03 microsecond by selecting the peak current at 5 and 8 amperes, respectively. Successive trains of elementary pulses of $\tau$on, $\tau$off, Ton and Toff substantially desired are thus obtained in conjunction with the adjustment of the oscillators 6 and 7.

Assume, for example, that the on-time and off-time of signal pulses at the oscillator 6 are each set at 0.01 microsecond. Then, by setting the peak current for detection at 2.5 amperes, the resulting discharge pulses can precisely have the duration $\tau$on of 0.01 microsecond and the interval $\tau$off of 0.01 microsecond. Likewise, when discharge pulses of $\tau$on=0.03 microsecond and $\tau$off=0.03 microsecond are to be precisely produced, the threshold peak current of 8 amperes can be used and the on-time and off-time of the signal pulses at the oscillator 6 can simply be adjusted identically with the desired discharge on-time $\tau$on and off-time $\tau$off. The adjustment of the oscillator 6 and the threshold peak current setting at the element 11 can be made as desired in conjunction with each other to provide a wide range of selection of machining pulse parameters. It has been found that this arrangement is particularly effective for production of discharge machining pulses of $\tau$on and $\tau$off each not less than 0.01 microsecond (10 nanoseconds) and especially advantageous for precisely controlling the pulse duration $\tau$on not greater than 1 microsecond or 10 microseconds.

The high-frequency elementary pulses of the first oscillator 6 and the low-frequency train forming pulses of the second oscillator 7 are combined at the AND gate 8. The result is that a succession of elementary signal pulses of $\tau$on and $\tau$off periodically interrupted or successive trains of elementary signal pulses of $\tau$on and $\tau$off and each having a duration Ton and cut-off time interval Toff are applied to the second AND gate 9. Each time the elementary signal pulse is applied, the power switch 5 is turned on and then controlledly turned off in response to the sensed discharge current reaching a preset level. In this manner, a succession of fine discrete elementary pulses of $\tau$on as short as 0.01 microsecond is readily obtained with high precision.

FIG. 3 diagrammatically illustrates certain examples of successive elementary pulses periodically interrupted for providing the corresponding discharges through the machining gap G. The succession of pulses may thus, for example, comprise trains of elementary pulses of on-time $\tau$on and off-time $\tau$off: with each train having two successive elementary pulses for a duration Ton and successive trains having an interval Toff (a); with each train having three elementary pulses for a duration Ton (b); with each train having six or more elementary pulses for a duration Ton and successive trains being separated by an interval Toff (c). The parameters $\tau$on, $\tau$off; Ton, Toff are set at the oscillators 6 and 7, respectively, as desired. The oscillators 6 and 7 can be synchronized in timing so that all elementary pulses have a preset on-time.

FIG. 3 shows a preferred embodiment for the discharge-current detector which can be used to replace the element 10 in FIG. 1. The detector in this embodiment includes a Hall-effect element 20, a core member 21 for applying a magnetic field to the Hall-effect element 20, and circuit terminals 22 provided for passing a measuring current and connected in series with the machining gap, the power supply 3, 4 and the power switch 5. Further, sensing-circuit terminals 23 are provided for detecting the Hall-effect's induced voltage. The core member 21 has an energizing coil 24 wound thereon and connected to an energizing source 25 via a switch 26 shown by a transistor. The switch 26 is operated by a control circuit 27 so that a constant strength of the magnetic field is always applied to the Hall-effect element 20. The Hall-effect element 20 may be composed, for example, of indium arsenide (InAs), silicon (Si) or germanium (Ge). This arrangement is capable of very high response to change in the measuring current and can follow as rapidly as at 50 to 100 MHz, and thus is especially suitable for sensing the instantaneous build-up and decay of the discharge gap current in the present invention.

FIG. 4 shows another possible form of the discharge-current detector which is of magnetic-amplifier type comprising a core member 31, a pair of load coils 32 and 33 and a current-sensing coil 34 having output terminals 35. The coil 32 serves as a bias coil energized by a constant source. When the discharge current is passed through the load coil 33, an amplified current signal is detected at the output terminals 35 at an extremely high response. The on-time in the order of 10 to 100 nanoseconds can be obtained precisely and effectively to allow the power supply to be reliably used for a diversity of applications including ultrafine finish machining and composite pulse machining.

What is claimed is:

1. A method of electrical-discharge-machining a workpiece with a tool electrode across a fluid-filled machining gap wherein a succession of machining pulses of a predetermined ontime $\tau$on and off-time $\tau$off are passed through the machining gap between the tool electrode and the workpiece by repetitively turning on and off an electronic switch connected in a power circuit in series with a DC source and the machining gap with a succession of signal pulses corresponding to the machining pulses, the power circuit having a stray impedance sufficient to cause a delay before each of the machining pulses terminates following the termination of each corresponding signal pulse applied to said switch, the method comprising the steps of:

setting said on-time $\tau$on at a desired value in the range between 0.01 and 1 microsecond;

sensing the rising gap current resulting from the passage of each of said machining pulses through said machining gap;

upon said sensed rising gap current exceeding a predetermined threshold value, providing a pulse interruption signal for terminating said corresponding signal applied to said switch; and establishing said threshold value in conjunction with said desired value of the on-time $\tau on$.

2. A method of electrical-discharge-machining a workpiece with a tool electrode across a fluid-filled machining gap, comprising the steps of:
passing a succession of machining pulses of a predetermined on-time $\tau on$ and off-time $\tau off$ through said machining gap between said tool electrode and said workpiece by repetitively turning on and off an electronic switch connected in a power circuit in series with a DC source and said machining gap with a succession of signal pulses corresponding to said machining pulses, said power circuit having a stray impedance sufficient to cause a delay before each of said machining pulses terminates following the termination of each corresponding signal pulse applied to said switch;
setting said on-time $\tau on$ at a desired value in the range between 0.01 and 1 microsecond;
sensing the rising gap current resulting from the passage of each of said machining pulses through said machining gap;
upon said rising gap current exceeding a predetermined threshold value, providing a pulse interruption signal and thereby terminating said corresponding signal pulse applied to said switch; and
establishing said threshold value in conjunction with said desired value of the on-time $\tau on$.

3. The method defined in claim 1 or claim 2 wherein said stray impedance comprises a capacitance in the range between 0.01 and 0.05 microfarad, an inductance in the range between 10 and 50 microhenry and a resistance in the order of $10^{-5}$ ohm.

4. The method defined in claim 3 wherein said on-time $\tau on$ of machining pulses substantially coincides with said on-time of signal pulses.

5. The method defined in claim 1 or claim 2 wherein said machining pulses are in the form of successive trains of elementary machining pulses and said switch is turned on and off by elementary signal pulses corresponding to said elementary machining pulses, further comprising the step of intermittently interrupting said elementary signal pulses to form said successive trains separated by a cut-off interval.

6. The method defined in claim 5 wherein said elementary signal pulses have an on-time and off-time each in the range between 0.01 and 1 microsecond.

7. The method defined in claim 5 wherein each of said successive trains contains a predetermined number of said elementary machining pulses.

8. A power-supply system for electrical-discharge-machining, comprising:
a DC source;
an electronic switch;
a power supply circuit for connecting said switch with a tool electrode and a workpiece in series with said DC source;
a driver circuit for providing a succession of signal pulses of a predetermined on-time and off-time and thereby turning said switch alternately on and off to pass through a machining gap between said tool electrode and said workpiece a succession of machining pulses of a predetermined on-time and off-time corresponding to said on-time and off-time of said signal pulses, said power supply circuit containing a stray impedance sufficient to cause a delay before each of said machining pulses terminates following the termination of each corresponding signal pulse;
a signal pulse source in said driver circuit for setting said on-time of the signal pulses at a desired value in the range between 0.01 and 1 microsecond;
means for sensing the rising gap current resulting from the passage of each of said machining pulses through said machining gap;
threshold circuit means responsive to the sensed rising gap current exceeding a predetermined threshold value and thereby terminating said corresponding signal pulse applied to said switch; and
means associated with the threshold circuit means for establishing said threshold value in conjunction with said desired value of the on-time of said signal pulses set in said signal pulse source.

9. The system defined in claim 8 wherein said stray impedance comprises a capacitance in the range between 0.01 and 0.05 microfarad, an inductance in the range between 10 and 50 microhenry and a resistance in the order of $10^{-5}$ ohm.

10. The system defined in claim 8 wherein said machining pulses are in the form of successive trains of elementary machining pulses, said driver circuit further including timing means associated with said signal pulse source for converting said signal pulses into successive and intermittently interrupted trains of elementary signal pulses and applying the latter to said switch to form said successive trains separated by a cut-off interval.

11. The system defined in claim 10 wherein said timing means includes a second signal pulse source for providing a succession of second signal pulses of a frequency lower than that of the first-mentioned signal pulses and AND gate means for receiving said succession of the first-mentioned signal pulses and said second signal pulses to provide said successive and intermittently interrupted trains of elementary signal pulses.

12. The system defined in claim 8 wherein said sensing means includes a Hall-effect element transducer.

13. The system defiend in claim 8 wherein said sensing means includes a magnetic-amplifier transducer.

* * * * *